(12) United States Patent
Arnicar et al.

(10) Patent No.: US 11,623,494 B1
(45) Date of Patent: Apr. 11, 2023

(54) SENSOR CALIBRATION AND VERIFICATION USING INDUCED MOTION

(71) Applicant: Zoox, Inc., Foster City, CA (US)

(72) Inventors: Taylor Andrew Arnicar, Sunnyvale, CA (US); Derek Adams, Santa Clara, CA (US); Michael Carsten Bosse, Cupertino, CA (US); Johannes Edren, Belmont, CA (US); Till Kroeger, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 469 days.

(21) Appl. No.: 16/801,537

(22) Filed: Feb. 26, 2020

(51) Int. Cl.
| | |
|---|---|
| *B60G 17/019* | (2006.01) |
| *G01C 25/00* | (2006.01) |
| *G01C 19/56* | (2012.01) |
| *G01P 15/02* | (2013.01) |
| *G01S 17/931* | (2020.01) |
| *G01P 21/00* | (2006.01) |

(52) U.S. Cl.
CPC .......... *B60G 17/019* (2013.01); *G01C 19/56* (2013.01); *G01C 25/005* (2013.01); *G01P 15/02* (2013.01); *G01P 21/00* (2013.01); *G01S 17/931* (2020.01)

(58) Field of Classification Search
CPC .... B60G 17/019; G01C 19/56; G01C 25/005; G01S 17/931; G01P 15/02
See application file for complete search history.

(56) References Cited

U.S. PATENT DOCUMENTS

| | | | | |
|---|---|---|---|---|
| 10,684,469 B2* | 6/2020 | Smith | ................. | G09G 5/363 |
| 11,112,252 B2* | 9/2021 | Gokhale | ................. | G01C 21/32 |

* cited by examiner

*Primary Examiner* — Bryan Bui
(74) *Attorney, Agent, or Firm* — Lee & Hayes, P.C.

(57) ABSTRACT

Motion can be induced at a vehicle, e.g., by actuating components of an active suspension system, and first sensor data and second sensor data representing an environment of the vehicle can be captured at a first position and a second position, respectively, resulting from the induced motion. A second sensor can determine motion information associated with the first position and the second position. Calibration information about the sensor, the first sensor data, and the motion information can be used to determine an expectation of sensor data at the second position. A calibration error can be the difference between the second sensor data and the expected sensor data.

20 Claims, 5 Drawing Sheets

US 11,623,494 B1

SENSOR CALIBRATION AND VERIFICATION USING INDUCED MOTION

BACKGROUND

Systems that rely on sensor data require accurate calibration of those sensors. For example, an autonomous vehicle may have multiple cameras, LIDAR sensors, radar sensors, and/or the like to detect objects, e.g., objects approaching the vehicle and/or objects the vehicle is approaching. Sensor data about such objects can be necessary to navigate relative to those objects. In some environments, including those in which pedestrians, bicyclists, and/or other vehicles may be present, potentially fatal collisions may occur if such sensors are not calibrated properly. Some current calibration techniques use infrastructure, such as fiducial markers, to calibrate sensors. For example, by capturing data of a fiducial marker, a correction term can be determined and applied to subsequently-captured data. While the infrastructure may be readily available at a location at which a system is manufactured or at other locations, subsequent calibration requires bringing the system (e.g. the autonomous vehicle) to a location that has infrastructure, resulting in undesirable downtime for the system and/or, for those examples which rely on sensors for navigation, potentially unsafe travel to the location. Existing calibration techniques that attempt to mitigate these drawbacks are often computationally expensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
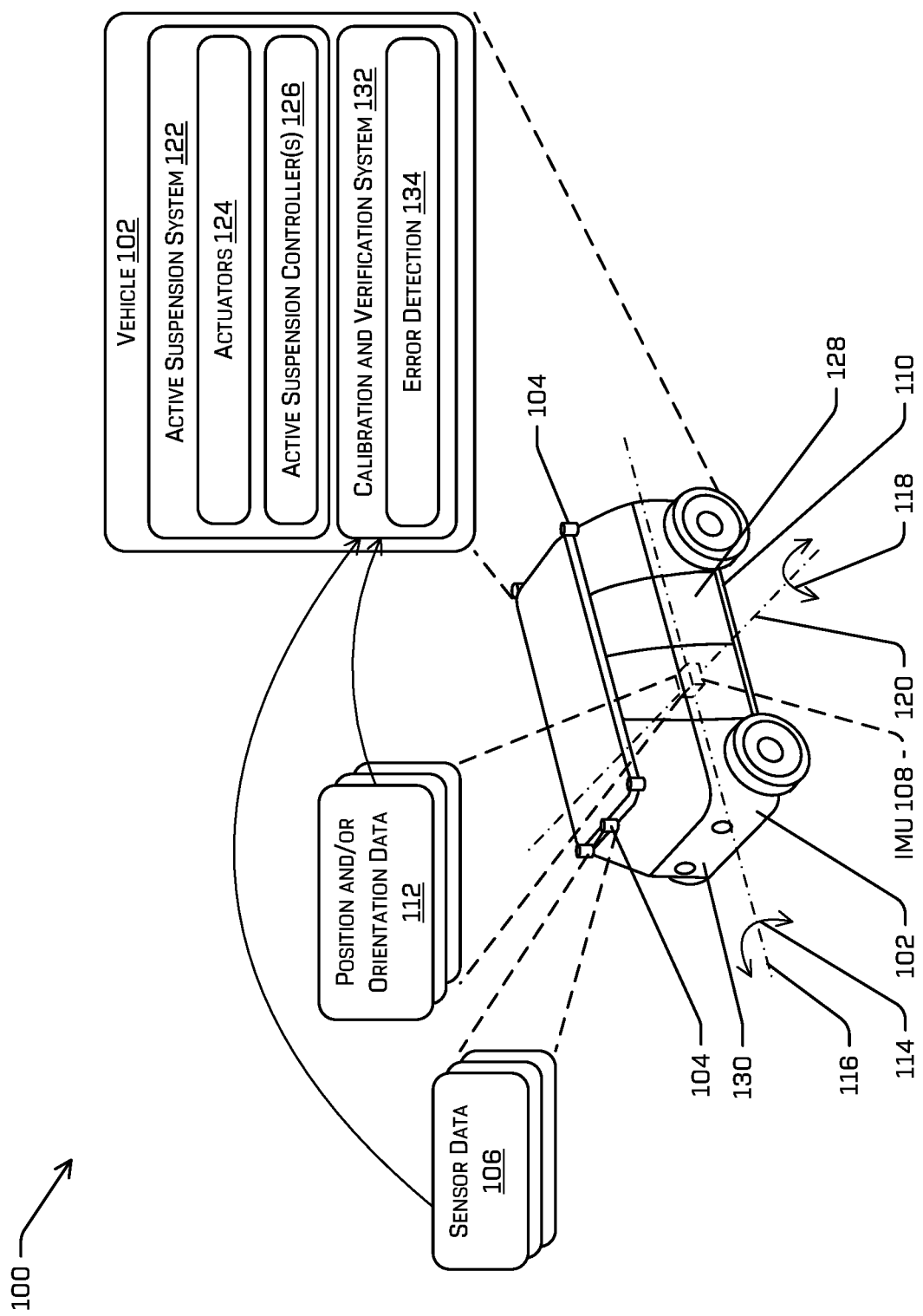
FIG. 1 is a schematic illustration showing an example vehicle, such as an autonomous vehicle, and example components and functionality of systems associated with the vehicle, as described herein.

Techniques described herein are directed to sensor calibration. In more detail, the disclosure relates to determining errors associated with sensors used in a system, such as an autonomous vehicle system. In examples, the errors can be used to calibrate the sensors and/or to validate sensor calibration. In general, such calibration may refer to either "extrinsic" calibration (that is determining one or more of a location or orientation of the sensor relative to some origin, e.g., an origin of the system) or "intrinsic" calibration (that is determining one or more parameters about the sensor itself, e.g., a focal length, a center point, a lens distortion model, or the like). In the context of an autonomous vehicle, the techniques descried herein can be used to calibrate and/or validate calibration of a single sensor or multiple sensors, including multiple sensors of the same or different modalities. When sensors are correctly calibrated (with respect to each other, with respect the vehicle, and/or internally), data from those sensors can be combined to produce an aligned representation of the environment of the vehicle. However, when the sensors are improperly calibrated, combining the sensor data may result in an inaccurate, or "blurry," representation of the environment. In a real-world example, as applied to autonomous vehicles and as an illustration of the need for a highly accurate calibration, a misalignment of sensors on the order of 0.5-degrees may result in an inability to determine with certainty a lane in which an object 100 meters away is travelling. While applicable to autonomous vehicle systems, aspects of this disclosure may be used in other systems that use sensors (e.g., robotic manipulators having one or more sensors/sensor modalities, and the like).

In examples described herein, calibration techniques can be used to verify or validate that sensors are properly calibrated. For instance, the techniques described herein can be used to quantify a calibration error and compare that error to a threshold error. In this manner, the techniques described herein can validate extrinsic and/or intrinsic calibration of a single sensor, independent of other sensors and/or independent of the sensed environment. The error can also be used to calibrate the sensor. For instance, subsequent sensor data can be modified in a manner that minimizes the calibration error.

In one example, the techniques described herein can include inducing motion of a vehicle, such as an autonomous vehicle. For instance, the vehicle can include an active suspension system including one or more actuators that can be controlled to induce motion at the vehicle. When the active suspension system is used to induce the motion, the vehicle may be otherwise stationary, e.g., parked. In other examples, the induced motion can result from controlling maneuvering of the vehicle, e.g., by causing the vehicle to swerve, corner, accelerate, decelerate, and/or impact objects in the environment. In still further examples, the motion can be induced by applying an external force to the vehicle.

The induced motion causes the vehicle to move between a first position and/or orientation and a second position and/or orientation. The techniques described herein can receive, e.g., from the sensor to be validated, first sensor data associated with the vehicle in the first position/orientation and second sensor data associated with the vehicle in the second position/orientation. Techniques described herein can be implemented on any number of sensors, including imaging sensors, ranging sensors, position sensors, or the like. In an example in which the sensor is a camera, the first sensor data may be a first image frame and the second sensor data may be a second image frame.

The techniques described herein can also determine differences between the first sensor data and the second sensor data. Continuing an example in which the sensor is a camera, the differences between the first sensor data and the second sensor data may be expressed as relative movement of image features between the first image frame and the second image frame. In examples, the relative movement can be quantified using epipolar geometry, optical flow, and/or other techniques.

In at least some examples, the techniques described herein can also receive motion data associated with the induced motion. For instance, the vehicle can include one or more inertial measurement units that detect relative movement of the vehicle, e.g., of a chassis of the vehicle. In examples, the motion data can include first position information about the first position/orientation and second position information about the second position/orientation. The first position information and/or the second position information can be expressed as rotational displacements about one or more axes. In other examples, the motion data may be a velocity or other derivative of the position/orientation information. In some examples, the inertial measurement unit(s) may be calibrated/zeroed prior to inducing the motion at the vehicle, and the position data may be related to the calibrated position. Such calibrated position may be based at least in part on determining a coordinate frame of reference by inducing an additional motion at the vehicle.

The techniques described herein can also determine a calibration error based at least in part on measured differences in the sensor data and an expected difference. Conceptually, the expected difference can be determined by projecting the first measured data to the second measured data using the measured motion data and calibration information about the sensor. Continuing the example from above in which the sensor is a camera, the expected difference may be a difference between the one or more image features in the first image frame and where those features would be expected to be sensed in the second image frame based on the rotational displacement of the sensor (known from the motion data) and the known calibration characteristics of the sensor. A residual between the measured difference(s) and the expected difference(s) may represent the calibration error.

According to techniques described herein, a single sensor can be calibrated, or multiple sensors can be calibrated independently. That is, because the techniques require comparison of multiple instances of data from a single sensor, sensor data from other sensors may not be required. Moreover, the techniques can be applied generally regardless of the environment. So long as one or more of the features identified in the sensed data are static, the techniques described herein may be applied. Accordingly, calibration verification can be performed with or without fiducials or other known environment information.

Calibration techniques discussed herein can improve the functioning of a computing device by providing a framework to determine and validate optimal calibration for sensors on an autonomous vehicle. By verifying calibration of one or more sensors using the calibration techniques described herein, the sensors can generate data representing an environment with a high degree of accuracy and precision about the environment. For example, sensors that have been calibrated and/or verified in this manner can provide more accurate data for segmentation, classification, route planning, etc., which can ultimately lead to better safety outcomes while driving. Furthermore, such improved calibration for sensors may improve processing and perception systems, for example, by providing more accurate starting points and better fused data for segmentation, classification, etc. These and other improvements to the functioning of a computing device are discussed.

The calibration techniques discussed herein also represent improvements over conventional calibration. For example, in the past, calibration techniques often required extensive infrastructure. For example, some techniques have included mounting a vehicle on a turntable and physically turning the vehicle while monitoring the data captured by sensors on the vehicle. Other systems required human operators to wave such fiducials in the sensors of such vehicles. Such conventional calibration techniques suffer from limited flexibility, often require additional and/or specialized calibration equipment, and/or result in a suboptimal calibration. In contrast, the techniques described herein may allow for infrastructure-free calibration. For example, techniques described herein may be able to automatically adjust for changes in calibration as a vehicle traverses through an environment, e.g., by considering new data as it is recorded. Moreover, the techniques described herein can be used to verify calibration sensors, e.g., by detecting miscalibration in near real time. Thus, the techniques discussed herein represent significant improvement over conventional calibration.

The methods, apparatuses and systems described herein can be implemented in a number of ways. Example implementations are provided below with reference to the following figures. Although discussed in the context of an autonomous vehicle, the methods, apparatuses, and systems described herein can be applied to a variety of systems requiring calibration of sensors prior to and/or during use and are not limited to autonomous vehicles. In another example, the methods, apparatuses, and systems may be utilized in an aviation context.

FIGS. 1-5 provide additional details associated with the techniques described herein.

FIG. 1 illustrates an example environment 100 in which an example vehicle 102 is located. The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

The vehicle 102 can include one or more sensor systems. For example, the vehicle 102 can include one or more sensors 104 disposed thereon (two of which are labelled) for generating data about the environment 100. The sensor(s) 104 may be fixed to the vehicle 102 and relative to other of the sensor(s) 104, and aspects of the sensor(s) 104 may be calibrated relative to each other and/or relative to the vehicle. In some instances, the sensor(s) 104 may be arranged to provide 360-degrees of coverage around the vehicle 102. Different of the sensor(s) 104 may have overlapping fields of view, e.g., to provide redundancy of information. The sensor(s) 104 can be, for example, one or more time-of-flight sensors, LiDAR sensors, RADAR sensors, SONAR sensors, image sensors, audio sensors, infrared sensors, location sensors, or the like, or any combination thereof. In the illustrated example, the sensor system(s) 104 generate sensor data 106 associated with the environment. The sensor data 106 may be any data type or data format. For instance, when the sensor(s) 104 include an image sensor, the sensor data 106 may be one or more image frames, when the sensor(s) 104 include a LiDAR sensor, the sensor data 106 may be point clouds associated LiDAR scans, and so forth. In some implementations, the sensor data 106 may be processed by a vehicle control system to identify and/or classify objects in the environment 100, e.g., trees, vehicles, pedestrians, buildings, road surfaces, signage, barriers, road marking, or the like and/or to navigate the vehicle 102 relative to such object(s).

The vehicle 102 can also include one or more sensor systems for generating data about the vehicle. For instance, FIG. 1 illustrates an inertial measurement unit (IMU) 108. The IMU 108 may be disposed on a frame or chassis 110 of the vehicle 102, e.g., such that the IMU 108 is fixed relative to the chassis 110. In examples, the IMU 108 may generate position and/or orientation data 112 about the vehicle 102. For instance, the IMU 108 can include one or more gyroscopes and/or accelerometers used to determine the position/orientation data 112, e.g., as relative rotational and/or translational information. In some implementations of this disclosure, the IMU 108 can be used to determine rotational changes of the vehicle 102 resulting from induced, e.g., purposefully induced as detailed further herein, motion of the vehicle 102. More specifically, the IMU 108 may be configured to determine first rotational motion (illustrated in FIG. 1 by first arrows 114) about a first axis 116 and/or to determine second rotational motion (illustrated in FIG. 1 by second arrows 118) about a second axis 120. In the illustrated example, the first axis 116 may be perpendicular to the second axis 120. The first axis 116 may generally align with (e.g., be parallel to or coincident with) a longitudinal axis of the vehicle 102 and the second axis 120 may generally align with (e.g., be parallel to or coincident with) a lateral axis of the vehicle 102. As noted, because the IMU 108 is fixed relative to the vehicle 102, e.g., the chassis 110 of the vehicle 102, the position/orientation data 112 generated by the IMU 108 can include information about a rotation of the chassis 110/vehicle 102 about the first axis 116 and/or the second axis 120.

Movement of the chassis 110 about the first axis 116 and/or the second axis 120 may be induced, e.g., intentionally, by controlling aspects of the vehicle. Such motion can be induced when the vehicle is parked or otherwise stationary on a driving surface, for example. For example, as illustrated in FIG. 1, the vehicle 102 can include an active suspension system 122. The active suspension system 122 can include actuators 124, which may include pneumatic and/or hydraulic cylinders, for example. The actuators 124 in the active suspension system 122 may be used conventionally to adjust suspension parameters, such as ride height, suspension stiffness, or the like. The active suspension system 122 can also include one/or more active suspension controllers 126 for controlling aspects of the active suspension system 122. For instance, the active suspension controller(s) 126 can cause air, oil, electric charge, or the like, to cause a piston of one or more of the actuators 124 to selectively change a position. In examples, the actuators 124 may be directly or indirectly connected to the chassis 110, such that movement of the actuators 124 can cause the chassis 110 to move, e.g., relative to the ground, relative to the wheels of the vehicle 102, or the like. By way of illustration, the active suspension controller(s) 126 can actuate (or cause to be actuated) the actuators 124 proximate a side (a first side 128 is labelled in FIG. 1) of the vehicle 102, e.g., by causing the chassis 110 on the side to raise or lift. Such a movement will cause a rotation about the first axis 116. Similarly, the active suspension controller(s) 126 can actuate (or cause to be actuated) the actuators 124 proximate an end (a first end 130 is illustrated in FIG. 1) of the vehicle 102 will cause a rotation about the second axis 120.

The active suspension system 122 is one example for inducing motion in the vehicle while stationary. As used herein, "stationary" can include a stopped position, e.g., in which the wheels do not rotate, and a substantially stopped position, e.g., in which at least a portion of the vehicle 102 stays in a footprint of the vehicle 102 throughout the induced motion. Thus, for example, the vehicle may move forward and backward and/or side-to-side as a result of rotation of the wheels, but such movement is minimal. In one example, moving the vehicle 102 minimally forward and relatively quickly induces motion about the second axis 120.

The vehicle 102 also includes a calibration and verification system 132. The calibration and verification system 132 is configured to receive the sensor data 106 and the position/orientation data 112 and determine, based at least in part on the data, whether the sensor(s) 104 from which the sensor data 106 is received is/are functioning properly. Using an image sensor as an example of the sensor(s) 104, the sensor data 106 may comprise a plurality of image frames. The image frames may be generated at a predetermined frequency, and the calibration and verification system 132 can receive these image frames substantially in real time. Because the image frames correspond to image data generated at different times, the sensor data 106 will include data generated throughout the range of motion induced by the active suspension system 122, discussed above. Accordingly, although the vehicle 102 may be not be travelling along a road or other driving surfaces, objects in the environment 100 and captured in the sensor data 106 will appear to move, e.g., because the active suspension system 122 has caused the chassis 110 and thus the sensor(s) 104 to move. The calibration and verification system 132 also receives the position/orientation data 112. The position/orientation data 112 provides information about how the chassis 110 has moved as a result of the induced motion. Because the sensor(s) 104 are fixed relative to the chassis 110, the position/orientation data 112 also provides information about the movement of the sensor(s).

As illustrated in FIG. 1, the calibration and verification system 132 also includes an error detection component 134. Conceptually, the error detection component 134 can compare differences from instances, e.g., frames, of the sensor data 106 to differences expected based on the position/orientation data 112. Continuing the example using an image sensor as the sensor(s) 104, features in a first image frame will appear moved in a second image frame because of the induced motion of the vehicle 102. Differences between these features across the two frames can be determined using known techniques, e.g., optical flow, or the like. Moreover, the position/orientation data 112 can provide relative movement of the chassis 110, and therefore the sensor(s) 104, between the time at which the first image frame is captured and the second image frame is captured. For instance, both the sensor data 106 and the position/orientation data 112 can include time information, e.g., timestamps, and the calibration and verification system 132 or the error detection component 134 can determine, based on the timestamps and from the position/orientation data 112, a first position/orientation of the sensor(s) 104 corresponding to the first frame and a second position/orientation of the sensor(s) 104 corresponding to the second frame. In examples, the error detection component 134 can determine an expected difference between the first image and the second image based on the measured positions/orientations. For instance, the error detection component 134 can generate an expectation of how features will move from the first position/orientation to the second position/orientation based on relative differences between those positions and details of the image sensor. Such details of the image sensor can include an orientation of the image sensor relative to the chassis 110, calibration details of the image sensor, e.g., intrinsic and/or extrinsic calibration details, and other information that would impact the image data.

Although the foregoing example may rely on time information to correlate instances of sensor data with positions/orientations, other implementations may not require time data. For example, a derivative of the position/orientation information, e.g., velocity information, may be used to characterize the motion of the sensor about the first axis 116 and/or the second axis 120, and such motion data can be used to similarly determine the expected returns.

Continuing the example, the error detection component 134 can compare the differences measured between the first image and the second image to the differences expected between those images. In some instances, the error detection component 134 can determine whether the comparison indicates that the image sensor is properly calibrated or improperly calibrated. For example, the error detection component 134 can generate, e.g., quantify, an error based on the comparison. When the error detection component 134 determines that the error is less than a threshold error, the calibration and verification system 132 can indicate the image sensor and/or the sensor data 106 as being reliable. Alternatively, when the error meets or exceeds the threshold error, the calibration and verification system 132 can indicate the image sensor and/or the sensor data 106 as unreliable. When the image sensor and/or the sensor data 106 is/are unreliable, the calibration and verification system 132 can alert the vehicle control systems to the malfunctioning sensor(s) 104, and the vehicle 102 can be controlled accordingly.

As described, the calibration and verification system 132 can validate one or more of the sensor(s) 104 by determining that differences between instances of the sensor data 106 comport with differences expected based on movement of the sensors capturing that sensor data. In examples, this validation can be done for any of the sensor(s) 104 independent of the environment 100 and independent of other of the sensor(s) 104. Regarding the former, assuming most objects in the environment 100 are stationary, the only "movement" of data associated with those objects form instance to instance of the sensor data will be because of the induced motion. Regarding the latter, the multiple instances of the sensor data are collected by the same sensor, so information about the position of other of the sensor(s) 104 and/or an overlapping field of view are not required. Moreover, as described, the motion may be induced by the vehicle 102, e.g., using the active suspension system 122, and thus the techniques described herein can be performed while the vehicle 102 is stationary. In one example implementation, the techniques described herein can be implemented when the vehicle 102 is powered up, e.g., before it goes onto the road, as a check to ensure that the sensor(s) 104 have not shifted or changed while the vehicle 102 was out of service. Such check can be performed generally regardless of the environment 100 and in near real-time. Similarly, the sensor (s) 104 can be validated when the vehicle 102 is otherwise stopped, e.g., at a traffic light or the like. Moreover, because individual of the sensor(s) 104 can be calibrated independently of other of the sensor(s) 104, the techniques described herein can be used to identify a faulty or improperly aligned sensor. By isolating a malfunctioning or misaligned sensor, sensor data 106 from only that sensor may be disregarded, which may allow the vehicle 102 to continue to operate in an altered state.

As discussed, the sensor(s) 104 can include an image sensor. An image sensor will generate image frames including information, e.g., color, intensity, or the like, on a per-pixel basis. Based at least in part on this information, the calibration and verification system 132 can perform conventional techniques to identify features in the image data, and track motion of such features across image frames. Feature-detection techniques can include, for example, edge-detection, corner-detection, or blob-detection. Tracking motion of the features can also include conventional techniques. For instance, an optical flow can be computed between the image frames, using known techniques. In another example, epipolar geometry techniques can be used to compute a fundamental matrix that describes the differences between the first image frame and the second image frame. The error detection component 134 can compare the fundamental matrix to expected differences to determine the error, discussed above.

The sensor(s) 104 can be other than image sensors and the sensor data 106 can be other than image frames. For instance, the sensor(s) 104 can include LiDAR and/or other range-type sensors. In the example of a LiDAR sensor, instances of the sensor data 106 can be a point-cloud including a number of points with associated depths. Each of the point clouds can be associated with a LiDAR scan. In some examples, the calibration and verification system 132 can detect object edges as depth discontinuities, and compute differences between such edges across multiple scans/point clouds. Other techniques also will be appreciated by those having ordinary skill in the art, with the benefit of this disclosure.

As noted above, a benefit of the techniques described herein may be that the validation can be performed using induced motion while the vehicle is stationary, e.g., via the active suspension system 122 or other actuators on the vehicle 102. However, the induced motion is not limited to being produced by the active suspension system 122. For example, the induced motion can be induced by an external force contacting a portion of the vehicle 102, e.g., an outer surface of the vehicle 102, to induce the motion. The disclosure is also not limited to induced motion while the vehicle 102 is otherwise stationary. The induced motion can result from operation of the vehicle 102. For instance, the vehicle 102 can be steered side-to-side to induce a motion about the first axis 116 and acceleration and deceleration can induce motion about the second axis 120. In examples, the vehicle 102 can be controlled according to one or more patterns to induce the desired motions. These and other alternative techniques for inducing the motion may be particularly beneficial when the vehicle does not include the active suspension system 122, for example.

Figure 2:
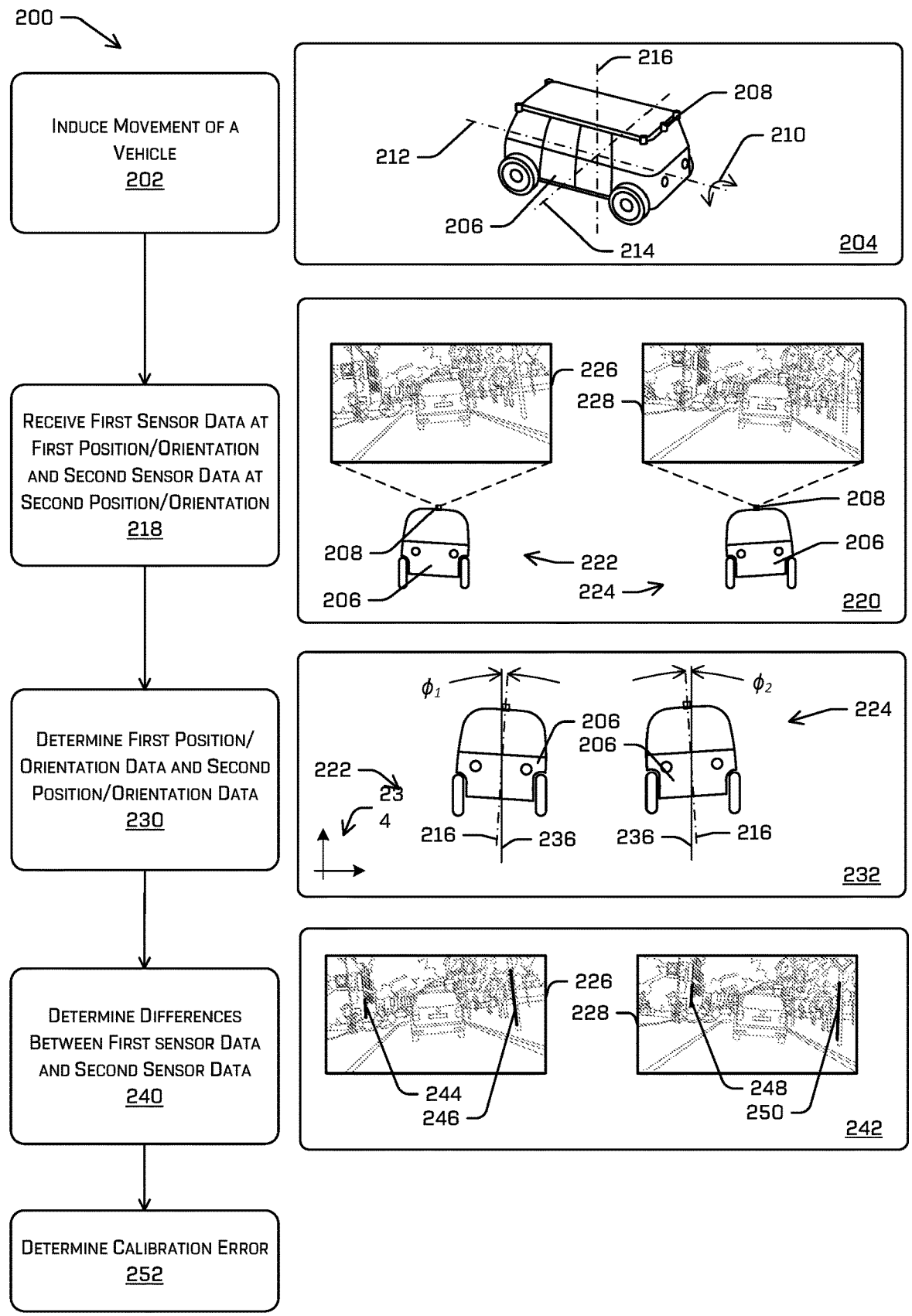
FIG. 2 includes textual and visual flowcharts to illustrate an example method for determining calibration errors in a sensor mounted on an autonomous vehicle, as described herein.

FIG. 2 depicts a pictorial flow diagram of an example process 200 for verifying calibration of a sensor mounted on a vehicle, in accordance with implementations of this disclosure.

At an operation 202, the process 200 can include inducing movement of a vehicle. An example 204 accompanying the operation 202 illustrates a vehicle 206 and an image sensor 208 mounted on the vehicle 206. The vehicle 206 may be the vehicle 102, and the image sensor 208 may be an example of the sensor(s) 104, discussed above. The arrows 210 in the example 204 illustrates that the vehicle 206 is being caused to rotate about a first axis 212. The first axis 212 may be arranged generally along, or parallel to, a longitudinal axis of the vehicle 206. The example 204 also illustrates a second axis 214, which may be arranged generally along, or parallel to, a lateral axis of the vehicle 206 and a third axis 216, which may be arranged generally along or parallel to, a central vertical axis of the vehicle 206. As described above, in some examples the movement may be induced via one or more systems on the vehicle 206, such as an active suspension system. When the active suspension system is used, the vehicle 206 may be otherwise stationary, e.g., parked. In other implementations, the movement may be induced by an external force acting on the vehicle 206.

At an operation 218, the process 200 can include generating first sensor data at a first position/orientation and second sensor data at a second position/orientation. For example, and as described above, the techniques described herein can be useful for determining whether a sensor is properly calibrated, using multiple instances of sensor data generated by that sensor. An example 220 accompanying the operation 218 illustrates the vehicle 206 in a first position/orientation 222 and a second position/orientation 224. The first position/orientation 222 and the second position/orientation 224 result from the motion induced at the operation 202, generally in the direction of the arrows 210. The image sensor 208 may continuously, e.g., at a predetermined frequency, generate sensor data. In the example 220, the image sensor 208 can generate first sensor data, e.g., a first image 226, with the vehicle 206 in the first position/orientation 222 and second sensor data, e.g., a second image 228, with the vehicle 206 in the second position/orientation 224. As illustrated, the first image 226 is similar to the second image 228, but the image appears rotated, resulting from rotation of the vehicle 206 about the first axis 212. In the illustrated example, the only movement is a rotation about the first axis 212, but in other examples, the rotation about the first axis 212 may be only a component of the motion induced at the operation 202. For example, there may also be rotation about the second axis 214, as described above in connection with FIG. 1.

At an operation 230, the process 200 can include determining first position data and second position data. An example 232 accompanying the operation 230 shows the vehicle 206 in each of the first position/orientation 222 and the second position/orientation 224. The example 232 also includes a coordinate frame of reference 234. For ease of illustration, the coordinate frame of reference 234 is illustrated by a horizontal axis and a vertical axis. In the example 232, as with the example 220, the vehicle 206 is viewed along the first axis 212, which is normal to horizontal and vertical axes of the coordinate frame of reference 234. Because the vehicle 206 moves only rotationally about the first axis 212, the movement of the vehicle is only in the coordinate frame of reference 234. In other implementations, the coordinate frame of reference 234 may be three dimensional. Also in this example, the horizontal and vertical axes may generally align with the second axis 214 (the lateral axis of the vehicle 206) and the third axis 216 (the vertical axis of the vehicle 206) although such is not required. In some instances, the coordinate frame of reference 234 can be determined based on a resting or static position of the vehicle 206, e.g., before motion is induced at the vehicle 206.

The coordinate frame of reference 234 may define a reference about which movement is measured. For example, the vehicle 206 may include an IMU that measures displacement or movement of the vehicle 206 within the coordinate frame of reference. The example 232 is illustrative. Specifically, for each of the first position/orientation 222 and the second position/orientation 224, the example 232 shows the third axis 216 (e.g., the (e.g., central or vertical axis) of the vehicle 206 and a reference line 236 that is vertical in the coordinate frame of reference. In this example, when the vehicle 206 is static, e.g., before motion is induced at the operation 202, the third axis 216 would be expected to be coincident with and/or parallel to the reference line 236. As shown, in the first position/orientation 222, the vehicle is rotated an angle $\Phi_1$, and, in the second position/orientation 224, the vehicle is rotated an angle $\Phi_2$. The angle $\Phi$ is the angle between the third axis 216 and the reference line 236, and the difference between $\Phi_1$ and $\Phi_2$ describes the relative movement of the vehicle 206 between the first position/orientation 222 and the second position/orientation 224. Because the vehicle 206 rotates only about the first axis 212 in this example, the difference between $\Phi_1$ and $\Phi_2$ describes the entire movement of the vehicle from the first position/orientation 222 to the second position.

At an operation 240, the process 200 includes determining differences between the first sensor data and the second sensor data. An example 242 accompanying the operation 240 conceptualizes the operation 240. Specifically, the example 242 identifies, in the first image 226, a first feature as a first edge 244 and a second feature as a second edge 246. Of course, the first edge 244 and the second edge 246 are for example only and more or fewer edges could be used. The example 242 also shows, in the second image 228, a third edge 248 corresponding to the first feature and a fourth edge 250 corresponding to the second feature. Although this example uses edges as image features, in other examples the features may be other than edges. For instance, image features can include points, surfaces, or the like. In at least some examples, the features may correspond to, for example, features determined using one or more of AKAZE, BRISK, SURF, SIFT, ORB, BRIEF, FAST, FREAK, embeddings, and the like.

The operation 240 can include determining differences between the first edge 244 and the third edge 248 and/or differences between the second edge 246 and the fourth edge 250. For example, the operation 240 can use epipolar geometry techniques to calculate a fundamental matrix representative of movement between the first sensor data and the second sensor data based at least in part on spatial distances between points on the first edge 244 and points on the third edge 248 and/or between points on the second edge 246 and point on the fourth edge 250. U.S. application Ser. No. 16/023,571, filed Jun. 29, 2018 and entitled "Sensor Calibration," and U.S. application Ser. No. 16/023,507, filed Jun. 29, 2018 and entitled "Infrastructure Free Intrinsic Calibration," describe aspects of using epiploar geometry to compute differences (errors) between multiple images. These applications are hereby incorporated by reference in their entirety. In examples, the fundamental matrix can include a rotation component and translation component. In the example 242, because the image sensor 208 is generally aligned parallel to the first axis 212, a computed fundamental matrix may include only a rotation component. In other examples in which a translation is identified, the translation component may be disregarded, e.g., because the vehicle may be stationary but for the induced motion. Epipolar geometry is only one example of determining differences between the images.

At operation 252 the process 200 can include determining a calibration error. For example, the calibration error may be the difference between changes observed from the first sensor data to the second sensor data (e.g., determined at the operation 240) and expected changes based on the measured difference between the first position and the second position. In the example described and illustrated in connection with the process 200, assuming the image sensor 208 is fixed relative to the IMU, e.g., via the chassis, and assuming a focal axis of the image sensor 208 is aligned with the first axis 212, an angle between the first edge 244 and the third edge 248 and an angle between the second edge 246 and the fourth edge 250 should correspond in a known manner to the difference between $\Phi_1$ and $\Phi_2$. The operation 252 determines any deviation as a calibration error. For example, the calibration error can be a distance, e.g., in pixels, between an image feature and an expected position of that image feature.

As will be appreciated, the calibration error may be an indication of whether the image sensor 208 is properly calibrated. For instance, the image sensor 208 can become misaligned over time, e.g., due to normal wear and tear on the vehicle 206, and/or as a result of some other external force, e.g., from a collision, impact with a pothole, or the like. Because the process 200 can be performed while the vehicle is stationary, e.g., before the vehicle begins operation, the risk of operating with an improperly aligned sensor is reduced, thereby improving safety outcomes. Moreover, because the process 200 relies on sensor data of any environment, e.g., not on fiducial markers or other infrastructure, the process 200 can be implemented regardless of time or location.

Figure 3:
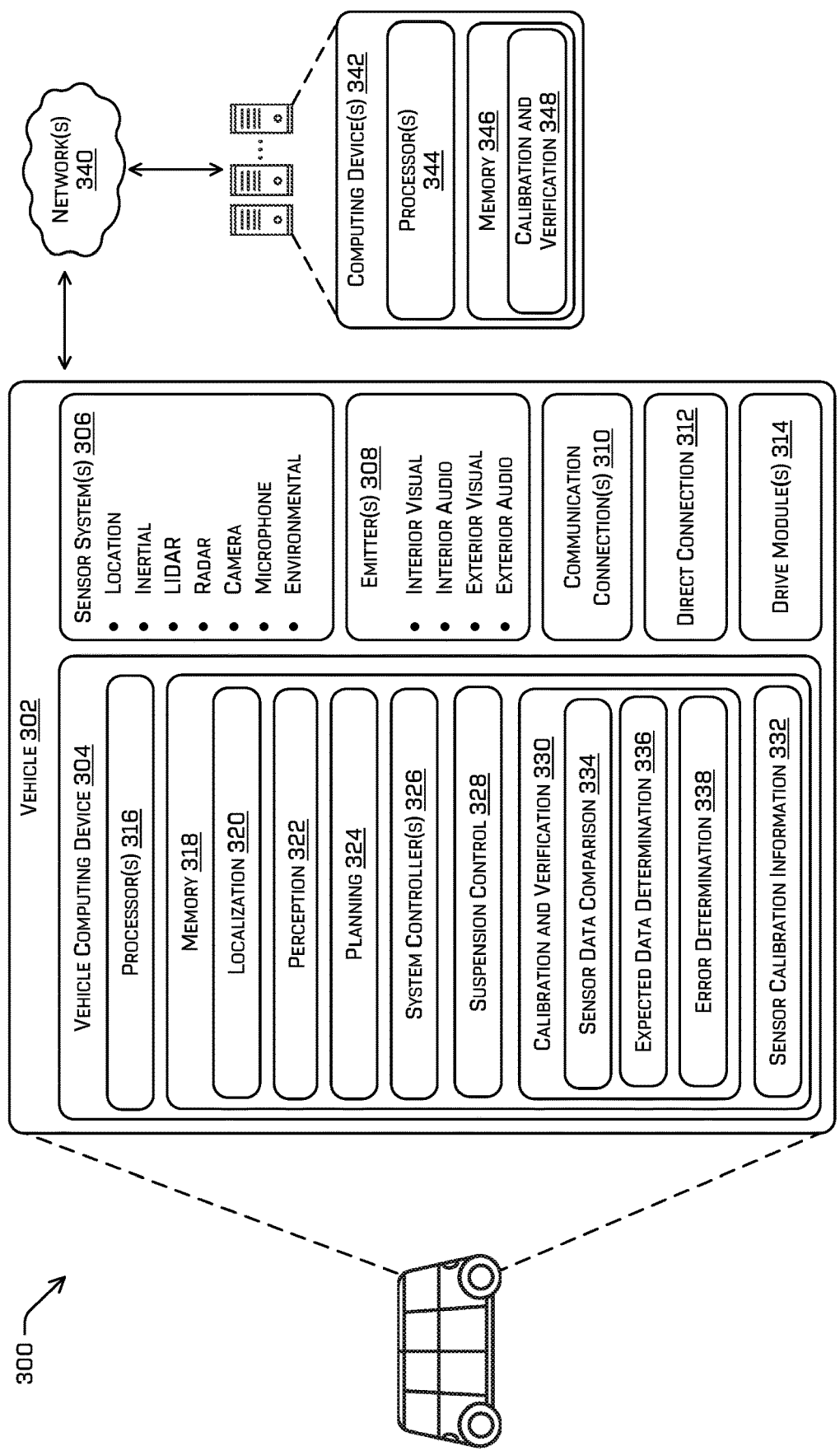
FIG. 3 is a block diagram of an example system for implementing embodiments of determining calibration errors, as described herein.

FIG. 3 illustrates a block diagram of an example system 300 for implementing the techniques described herein. In at least one example, the system 300 can include a vehicle 302, which can be the same vehicle as the vehicle 102 or the vehicle 206 described above with reference to FIGS. 1 and 2, respectively.

The vehicle 302 can include a vehicle computing device 304, one or more sensor systems 306, one or more emitters 308, one or more communication connections 310, at least one direct connection 312, and one or more drive modules 314.

The vehicle computing device 304 can include one or more processors 316 and memory 318 communicatively coupled with the processor(s) 316. In the illustrated example, the vehicle 302 is an autonomous vehicle; however, the vehicle 302 can be any other type of vehicle. In the illustrated example, the memory 318 of the vehicle computing device 304 stores a localization component 320, a perception component 322, a planning component 324, one or more system controllers 326, a suspension control system 328, a calibration and verification component 330, and sensor calibration information 332. Further, the calibration and verification component 330 can include a sensor data comparison component 334, an expected data determination component 336, and an error determination component 338. Though depicted in FIG. 3 as residing in the memory 318 for illustrative purposes, it is contemplated that certain components, including but not limited to the calibration and verification component 330 and the sensor calibration information 332, may additionally, or alternatively, be accessible to the vehicle 302 (e.g., stored remotely).

In at least one example, the localization component 320 can include functionality to receive data from the sensor system(s) 306 to determine a position of the vehicle 302. For example, the localization component 320 can include, request, and/or receive a three-dimensional map of an environment and can continuously determine a location of the autonomous vehicle within the map. In some instances, the localization component 320 can utilize SLAM (simultaneous localization and mapping) or CLAMS (calibration, localization and mapping, simultaneously) to receive image data, LIDAR data, radar data, SONAR data, IMU data, (global positioning system) GPS data, wheel encoder data, and/or the like to accurately determine a location of the vehicle 302. In some instances, the localization component 320 can provide data to various components of the vehicle 302 to determine an initial position of the vehicle 302 for generating a candidate trajectory, or for correlating calibration operations, as discussed herein. In the context of this disclosure, in some instances, functionality associated with the localization component 320 may be used to calculate a pose or position information of the vehicle 302 when motion is induced at the vehicle, as described herein. For instance, the localization component 320 can receive information from an IMU and determine a pose or position of the vehicle 302 relative to a previous pose or position. Such poses may be independent of the environment in which the vehicle 302 is operating, but instead relative to each other.

In some instances, the perception component 322 can include functionality to perform object detection, segmentation, and/or classification. In some examples, the perception component 322 can provide processed sensor data that indicates a presence of an entity that is proximate to the vehicle 302 and/or a classification of the entity as an entity type (e.g., car, pedestrian, cyclist, animal, unknown, etc.). In additional and/or alternative examples, the perception component 322 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (e.g., size), etc. Characteristics associated with the environment can include, but are not limited to, a presence of another entity in the environment, a state of another entity in the environment, a time of day, a day of a week, a season, a weather condition, an indication of darkness/light, etc. In aspects of this disclosure, information from the perception component 322 may be used to identify features in sensor data. For instance, semantic segmentation information may be used to identify objects that can be compared between instances of sensor data.

In general, the planning component 324 can determine a path for the vehicle 302 to follow to traverse through an environment. For example, the planning component 324 can determine various routes and trajectories and various levels of detail. For example, the planning component 324 can determine a route to travel from a first location (e.g., a current location) to a second location (e.g., a target location). For the purpose of this discussion, a route can be a sequence of waypoints for travelling between two locations. As non-limiting examples, waypoints include streets, intersections, GPS coordinates, etc. Further, the planning component 324 can generate an instruction for guiding the autonomous vehicle along at least a portion of the route from the first location to the second location. In at least one example, the planning component 324 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique. In the context of this disclosure, the planning component 324 can be used to induce motion of the vehicle 302. Although some examples involve inducing motion when the vehicle 302 is static, other implementations may use motion of the vehicle 302 to induce the motion. For instance, when the vehicle 302 does not include an active suspension, the planning component 324 can identify a trajectory or series of trajectories that will cause a desired induced motion. By way of non-limiting example, the planning component 324 can cause the vehicle 302 to swerve to induce a motion about a longitudinal axis of the vehicle. Also in examples, the planning component 324 can control the vehicle to hit obstacles, e.g., potholes, railroad tracks, or the like, at an appropriate speed and/or angle to induce the desired motion.

The system controller(s) 326, can be configured to control steering, propulsion, braking, safety, emitter, communication, and other systems of the vehicle 302. The system controller(s) 326 can communicate with and/or control corresponding systems of the drive module(s) 314 and/or other components of the vehicle 302.

The suspension control system 328 can be an example of the system controller(s) 326 or a separate component. The vehicle 302 can include an active suspension, which may include one or more actuators, and the suspension control system 328 may control such actuators to induce a desired motion. As detailed herein, the motion may be imparted with the vehicle 302 otherwise stationary, e.g., to induce rotation about one or both of a longitudinal axis and a lateral axis of the vehicle 302.

In general, the calibration and verification component 330 can include functionality to determine whether one or more of the sensor system(s) 306 are properly calibrated. For instance, the calibration and verification component 330 may validate an external calibration of a sensor, e.g., relative to the vehicle. The calibration and verification component 330 can detect improperly calibrated sensors, schedule calibration routines, and/or send calibration data to one or more other components of the vehicle 302 that utilize data produced by the sensor system(s) 306.

The sensor data comparison component 334 feature can include functionality to analyze and compare instances of sensor data to determine differences between those instances. For example, the sensor data comparison component 334 can determine corresponding features in images, LiDAR scans, point clouds, or the like, and quantify movement of those features. For instance, the sensor data comparison component 334 can implement feature extraction techniques, e.g., to identify SURF, SIFT, AKAZE, ORB, BRIEF, FAST, FREAK, or the like features, though any other feature is contemplated. The sensor data comparison component 334 may generate a matrix, e.g., a fundamental matrix or central matrix, representative of the movement between instances of the sensor data. The differences may be determined using epipolar geometry, optical flow, or other techniques.

The expected data determination component 336 can generate information about expected variations in sensor data. As described herein, aspects of this disclosure involve inducing motion in the vehicle 302. Such motion causes sensor data to vary, because of the relatively different positions of the sensor system(s) 306 during the motion. These variations in the sensor data can be quantified by the sensor data comparison component 334, as just described. The expected data determination component 336 can receive information about positions of the sensor system(s) 306 during the induced motion and determine an expectation of differences, e.g., rotational differences, of features in sensor data based on those positions. For instance, the expected data determination component 336 can receive the position information from an IMU, access the sensor calibration information 332, and generate an expectation associated with the sensor data based on the positional differences and the specifics of the sensor(s) under consideration.

The sensor calibration information 332 can include calibration data associated with one or more of the sensor system(s) 306. In some instances, the sensor calibration information 332 can include one or more calibration angles (or calibration characteristics, generally) associated with a sensor. In some instances, sensor calibration information 332 can include mounting angles and/or positions of sensors and/or any extrinsic and/or intrinsic information associated with the one or more sensors, including but not limited to, calibration angles, mounting location, height, direction, yaw, tilt, pan, timing information, lens distortion parameters, transmission medium parameters, and the like. Further, sensor calibration information 332 can include a log of some or all of the calibration operations performed, such as a time elapsed from the most recent calibration, and the like.

The error determination component 338 can include functionality to determine variations between the sensor data comparison, performed by the sensor data comparison component 334, and information generated by the expected data determination component 336. For instance, the error determination component 338 can compute a distance, e.g., measured in pixels, between the location of a feature in measured sensor data and the expected location of that feature, based on the measured positional change. Other systems and/or components of the vehicle 302 can use information generated by the error determination component 338. For instance, the perception component 322 can use information from the error determination component 338 to determine whether and which sensor system(s) 306 are providing reliable information.

Also in examples, the calibration and verification component 330 can use error information determined by the error determination component 338 to calibrate the sensor. For instance, the calibration and verification component 330 can minimize the error determined by error determination component 338 and update the sensor calibration information 332 accordingly. Thus, the calibration and verification component 330 may include functionality to calibrate the sensor system(s) 306 in addition to functionality to verify that a sensor is functioning properly.

In some instances, aspects of some or all of the components discussed herein may include any models, algorithms, and/or machine learning algorithms. For example, in some instances, the components in the memory 318 (and memory 346, discussed below) may be implemented as a neural network.

As described herein, an exemplary neural network is a biologically inspired algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 306 can be similar to the sensor system(s) 104 described above with reference to FIG. 1. The sensor system(s) 306 can include time-of-flight sensors, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 306 can include multiple instances of each of these or other types of sensors. For instance, instances of the same sensor modality may be located at the corners, front, back, sides, and/or top of the vehicle 302. As another example, the camera sensors can include multiple cameras disposed at various locations about the exterior and/or interior of the vehicle 302.

The sensor system(s) 306 can generate sensor data and provide such data to the vehicle computing device 304. For instance, the sensor data comparison component 334 can receive sensor data from the sensor system(s) 306 to calculate differences, e.g., rotational differences of features across instances of the sensor data. Moreover, the expected data determination component 336 can receive data from the inertial sensors, e.g., an IMU, to determine the expected differences in data, as detailed herein. Additionally, or alternatively, the sensor system(s) 306 can send sensor data, via one or more networks 340, to the one or more computing device(s) at a particular frequency, after a lapse of a predetermined period of time, in near real-time, etc.

The emitter(s) 308 can emit light and/or sound. In the illustrated example, the emitter(s) 308 can include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 can also include exterior emitters. By way of example and not limitation, some example exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The communication connection(s) 310 enable communication between the vehicle 302 and one or more other local or remote computing device(s). For instance, the communication connection(s) 310 can facilitate communication with other local computing device(s) on the vehicle 302 and/or the drive module(s) 314. Also, the communication connection(s) 310 can allow the vehicle to communicate with other nearby computing device(s) (e.g., other nearby vehicles, traffic signals, etc.). The communication connection(s) 310 also enable the vehicle 302 to communicate with a remote teleoperations computing device or other remote services.

The communication connection(s) 310 can include physical and/or logical interfaces for connecting the vehicle computing device 304 to another computing device or a network, such as the network(s) 340. For example, the communication connection(s) 310 can enable Wi-Fi-based communication such as via frequencies defined by the IEEE 802.11 standards, short range wireless frequencies such as Bluetooth, cellular communication (e.g., 2G, 3G, 4G, 4G LTE, 3G, etc.) or any suitable wired or wireless communications protocol that enables the respective computing device to interface with the other computing device(s).

In some examples, the drive module(s) 314 can include a single drive module. In other examples, the vehicle 302 can have multiple drive modules, and individual of the drive module(s) 314 can be positioned on opposite ends of the vehicle 302 (e.g., the front and the rear, etc.). In at least one example, the drive module(s) 314 can include one or more sensor systems to detect conditions of the drive module(s) 314 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, RADAR sensors, etc. Some sensors, such as the wheel encoders can be unique to the drive module(s) 314. In some cases, the sensor system(s) on the drive module(s) 314 can overlap or supplement corresponding systems of the vehicle 302 (e.g., the sensor system(s) 306).

The drive module(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 314. Furthermore, the drive module(s) 314 also include one or more communication connection(s) that enable communication by the respective drive module with one or more other local or remote computing device(s).

The processor(s) 316 of the vehicle 302 can be any suitable processor capable of executing instructions to process data and perform operations as described herein. By way of example and not limitation, the processor(s) 316 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 318 is an example of non-transitory computer-readable media. The memory 318 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of the vehicle 302 can be associated with remote computing devices accessible via one or more networks 340.

For example, the vehicle 302 can send sensor data to one or more computing device(s) 342 via the network(s) 340. In some examples, the vehicle 302 can send raw sensor data to the computing device(s) 342. In other examples, the vehicle 302 can send processed sensor data and/or representations of sensor data to the computing device(s) 342. In some examples, the vehicle 302 can send sensor data to the computing device(s) 342 at a particular frequency, after a lapse of a predetermined period of time, in near real-time, etc. In some cases, the vehicle 302 can send sensor data (raw or processed) to the computing device(s) 342 as one or more log files.

The computing device(s) 342 can receive the sensor data (raw or processed) and can perform calibration operations on the data. In at least one example, the computing device(s) 342 can include one or more processors 344 and memory 346 communicatively coupled with the one or more processors 344. In the illustrated example, the memory 346 of the computing device(s) 342 stores a calibration and verification component 348, which can include functionality to perform operations similar to those discussed above in the context of the calibration and verification component 330. In some instances, the processor(s) 344 and the memory 346 can include functionality and/or structure similar to that discussed above with respect to the processor(s) 316 and the memory 318.

Figure 4:
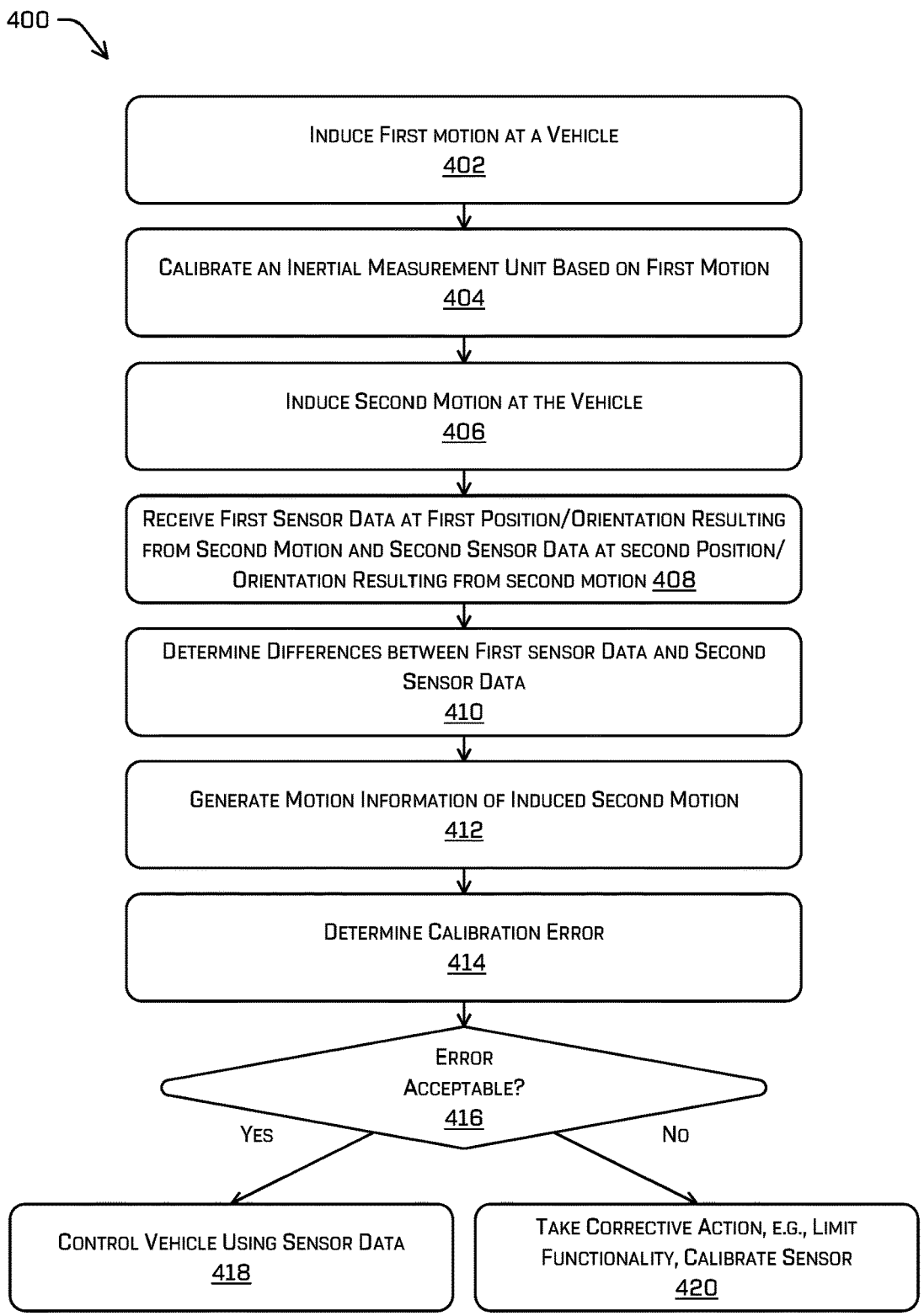
FIG. 4 is an example process for determining calibration errors using induced motion, in accordance with implementations described herein.
Figure 5:
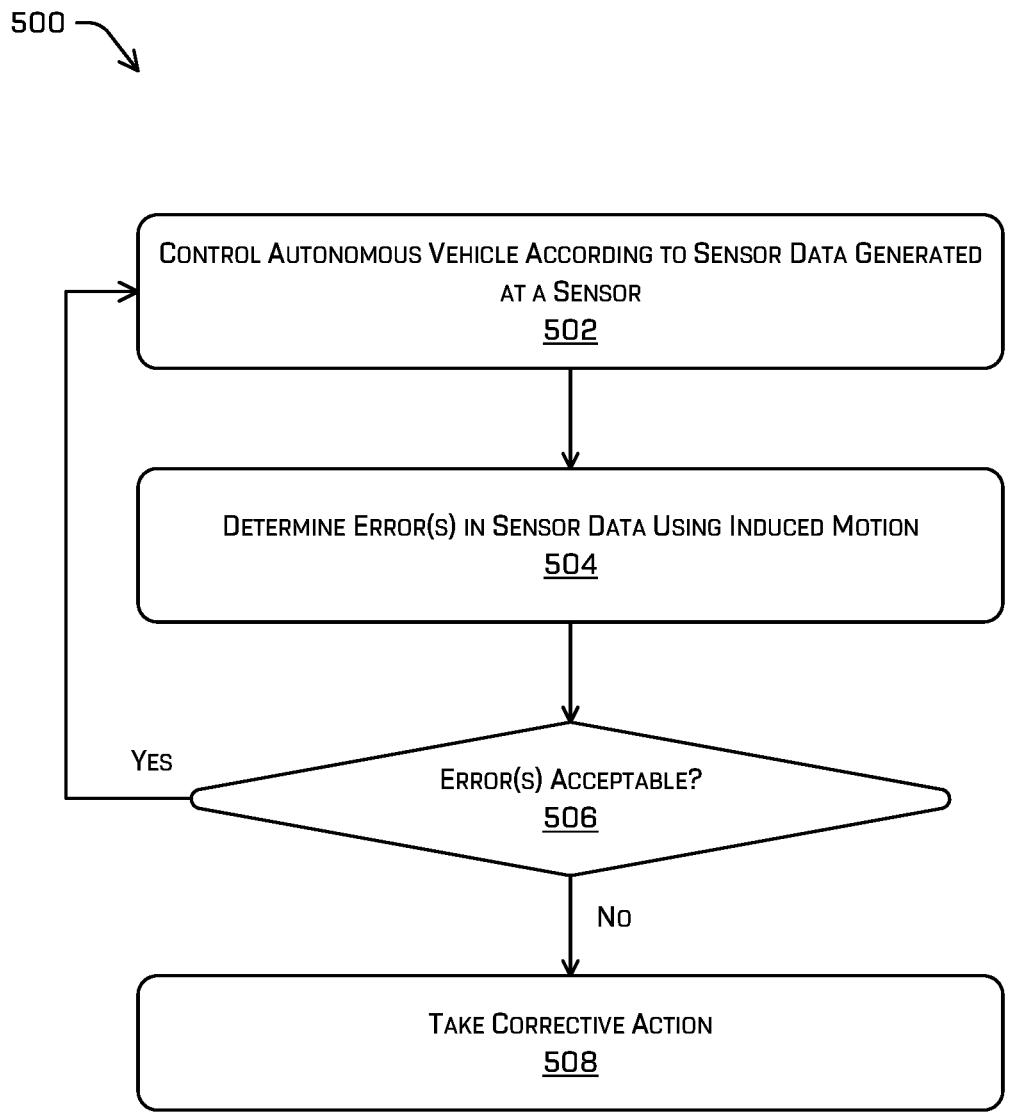
FIG. 5 is an example process for calibrating intrinsic characteristics of sensors, in accordance with implementations described herein.

FIGS. 2, 4, and 5 illustrate example processes in accordance with embodiments of the disclosure. These processes are illustrated as logical flow graphs, with each operation representing a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 depicts an example process 400 for calibrating extrinsic and/or intrinsic characteristics of one or more cameras. For example, some or all of the process 400 can be performed by one or more components in FIG. 3, as described herein. Without limitation, portions of the process 400 can be performed by the calibration and verification component 330 and/or the calibration and verification component 348.

At operation 402, the process 400 can include inducing first motion at a vehicle. In some examples, the vehicle may include an active suspension system including one or more actuators that may be selectively actuated to cause motion of the vehicle. In examples, the first motion can be imparted with the vehicle otherwise static, e.g., parked, and generally regardless of the environment of the vehicle. For instance, the process 400 may function in the absence of fiducials, although the processes and techniques described herein also function with fiducials. In at least some examples, the motion may be a predetermined motion, e.g., a pattern, resulting in rotational motion about one or more of a longitudinal axis of the vehicle and a lateral axis of the vehicle.

At operation 404, the process 400 can include calibrating an inertial measurement unit (IMU) based on the first motion. For example, the IMU can include gyroscopes for determining rotational movements. The first motion may be configured such that the IMU can receive a plurality of measurements to determine a frame of reference for the vehicle. For instance, the operation 404 can generate the coordinate frame of reference 234. In on example, the first motion may be used to determine the longitudinal axis of the vehicle and/or the lateral axis of the vehicle. The operation 404 can be performed without any reference to an environment of the vehicle. For instance, while IMUs may be used conventionally on vehicles to measurement movement for the purpose of determining relative positions, e.g., an updated pose relative to a computed pose after the vehicle travels some distance, the operation 402 may include centering or zeroing the IMU based on the first motion.

At operation 406, the process 400 can include inducing a second motion at the vehicle. As noted above with reference to the operation 402, the vehicle may include an active suspension system and/or other onboard actuators that are controllable to induce motion. As with the first motion, the second motion may include rotation about one or both of the longitudinal axis of the vehicle and the lateral axis of the vehicle. In some instances, the second motion may be configured to produce measurable discrepancies in sensor data. For example, the second motion may include a pattern or other characteristics based on the sensor to be verified. By way of non-limiting example, sensor data generated by sensors that include rolling shutters may benefit from relatively slower motion, e.g., to avoid motion artifacts. In contrast, the IMU may be calibrated at operation 404 using relatively faster motion, so in some instances the second motion may be faster than the first motion, although such is not required.

At operation 408, the process 400 can include generating first sensor data at a first position/orientation resulting from the second motion and second sensor data at a second position/orientation resulting from the second motion. For example, a sensor for which calibration is to be verified can generate instances of sensor data serially, e.g., at a predetermined frequency. The first sensor data can be a first instance generated at some position and/or orientation and the second sensor data can be a second instance generated at a different position and/or orientation. As described herein, the sensor calibration verification techniques can be applied to different sensor modalities generating different data types. For example, the first sensor data generated at the operation 408 and the second sensor data generated at the operation 410 can include image data, depth data, point clouds, scan data, or the like.

At operation 410, the process 400 can include determining differences between the first sensor data and the second sensor data. For example, when the induced motion includes rotation about the longitudinal axis of the vehicle and/or the lateral axis of the vehicle, the sensor data will vary based on the movement. The first image 226 and the second image 228 discussed in connection with FIG. 2, are examples of sensor data associated with different positions. In examples, the process 400 can include detecting features in each of the first sensor data and the second sensor data and quantifying relative movement of those features between the first sensor data and the second sensor data. In examples, the process 400 can include determining only rotational differences, although translational differences may also be determined. The differences may be determined as a matrix, e.g., a fundamental matrix. In other instances, the differences may be characterized as an optical flow between the instances. The sensor data comparison component 334 can execute the operation 410 in some instances.

At operation 412, the process 400 can include generating motion information associated with the second motion. For example, the IMU calibrated at the operation 404 can determine position information, e.g., relative to a frame of reference, for each of the first position/orientation and the second position/orientation. In implementations, the position information can include rotational displacements relative to an axis, such as a vertical axis, for example. In other examples, the motion data can include one or more derivatives of the position/orientation, e.g., velocity information corresponding to the second motion. Although the IMU is used in this example for determining the motion data, the techniques described herein can generate the motion data from any sensor that is properly calibrated. For instance, sensor data from any sensor known to be properly calibrated can be used to determine expected sensor data for a sensor to be evaluated.

At operation 414, the process 400 can include determining a calibration error. For example, calibration errors may be variations in the measured sensor data and data expected based on the motion data. As described herein, the error determination component 338 can include functionality to compare the measured differences, e.g., measured in the operation 410, to an expectation, e.g. an expected displacement. The expectation can be generated by the expected data determination component 336. In some examples, the calibration error may be a distance, e.g., a Euclidean distance, between the measured data and expected data. In other examples, the error may be a residual between a rotational component of a matrix, e.g., determined using epipolar geometry and/or optical flow, and expected rotational deviations.

At operation 416, the process 400 can include determining whether the calibration error is acceptable. For example, the calibration error determined at the operation 414 may be compared to a threshold calibration error. The threshold calibration error can be an average of a number of points, including points associated with different objects and/or features, or individual points can be compared to the threshold, an average distance from a line or plane, a measure of collinearity or coplanarity, or the like.

If, at operation 416, it is determined that the calibration error is equal to or less than a threshold error, i.e., that the error is acceptable, at operation 418 the process 400 can include controlling the vehicle using the sensor data. Thus, for example, the process 400 can serve as a verification that the sensor(s) continue to be properly calibrated, e.g., within a predetermined threshold.

Alternatively, if, at operation 416 it is determined that the calibration error is equal to or greater than a threshold error, i.e., that the error is not acceptable, at operation 420 the process 400 can include taking a corrective action. In some examples, the corrective action may include discontinuing reliance on the sensor data until the sensor can be re-calibrated. In other implementations, for example, in instances in which the discontinuing use of the sensor data would result in unsafe operation of the vehicle, the corrective action may include taking the vehicle out of service, prohibiting navigation with the vehicle, inhibiting some or all functionality (e.g., inhibiting subsystems, certain types or directions of navigation, travel above a certain speed, or the like), and/or requesting assistance for navigation. In still other examples, the corrective action may include determining updated calibration information and calibrating subsequent sensor data in accordance with the updated calibration information. For example, techniques described herein may determine a calibration function that minimizes the calibration error determined at the operation 414. In some examples, the calibration function may be determined over several iterations of the sensor data, e.g., over a period of time or number of returns, and/or based on other data, including data from other sensors, semantic segmentation information, or the like. For example, the operation 420 can include sending the calibration function to one or more of a localization system (e.g., the localization component 320), a perception system (e.g., the perception component 322), and the like. In some instances, the calibration function can be used by one or more systems of the vehicle to align or otherwise adjust data captured by the one or more sensors so that the data can represent the environment in a more accurate manner. Thus, for example, while techniques described herein can be used to validate sensor data, e.g., by determining that a calibration error is within a threshold error, techniques described herein may also be used to calibrate data, e.g., when a calibration error indicates that the sensor is no longer properly calibrated.

In implementations, operations of the process 400 may be performed separate from and/or without other operations. By way of non-limiting example, while the process 400 includes the operation 402 and the operation 404 for calibrating the IMU(s), in some instances the IMU may already be calibrated (or otherwise calibrated). In these examples, the process 400 may omit the operation 402 and the operation 404.

FIG. 5 depicts an example process 500 for controlling an autonomous vehicle based at least in part on calibrated sensor data, as discussed herein. For example, some or all of the process 500 can be performed by one or more components in FIG. 3, as described herein. For example, some or all of the process 500 can be performed by the localization component 320, the perception component 322, the planning component 324, and/or the system controller(s) 326.

At operation 502, the process 500 can include controlling an autonomous vehicle according to sensor data generated by a sensor on the vehicle. As described herein, an autonomous vehicle, such as the vehicle 102, the vehicle 206, or the vehicle 302, may include one or more sensor systems of one or multiple modalities fixed thereto. Various components, including the localization component 320, the perception component 322, the planning component 324, and/or the system controller(s) 326 may rely on the sensor data to determine and execute drive instructions, e.g., trajectories, for the vehicle 302. By way of non-limiting example, the controls for the vehicle can be based on a presence of objects or agents external to an autonomous vehicle in an environment and represented in the sensor data.

At operation 504, the process 500 can include determining errors in sensor data using induced motion. For example, the operation 504 can include the processes 200 and/or 400 discussed above, in which motion of a vehicle is induced and sensor data captured at different positions/orientations resulting from the movement is compared to expected sensor data, which can be calculated using the measured motion.

At operation 506, the process 500 can determine whether the errors determined at the operation 504 are acceptable. By way of non-limiting example, the errors may be acceptable when measured differences of the sensor data comport with an expected measurement within a threshold error. If, at the operation 506, it is determined that the errors are acceptable, processing returns to the operation 502, and the vehicle continues to be controlled according to the sensor data, e.g., because the sensor calibration has been validated within a threshold error.

However, if, at the operation 506, it is determined that the errors are not acceptable, at operation 508, the process 500 can include taking a corrective action. In some examples, the corrective action may include discontinuing reliance on the sensor data until the sensor can be re-calibrated. In other implementations, for example, in instances in which the discontinuing use of the sensor data would result in unsafe operation of the vehicle, the corrective action may include taking the vehicle out of service and/or requesting assistance to navigate the vehicle. In still other examples, the corrective action may include determining updated calibration information and calibrating subsequent sensor data in accordance with the updated calibration information.

As will be appreciated, according to the process 500, sensor calibration validation can be performed in real-time or at near real-time. Accordingly, the vehicle can take corrective action in real-time or near real-time, thereby increasing operation safety of the vehicle, among other benefits.

Example Clauses

A: An example vehicle includes: an inertial measurement unit; an active suspension system; a sensor mounted on the vehicle, the sensor being configured to generate sensor data; one or more processors; and memory storing instructions executable by the one or more processors to cause the vehicle to perform acts comprising: controlling the active suspension system to induce a motion of the vehicle; receiving, from the sensor, first sensor data generated with the sensor in at least one of a first position or a first orientation resulting from the motion; receiving, from the sensor, second sensor data generated with the sensor in at least one of a second position or a second orientation resulting from the motion; receiving, from the inertial measurement unit, first position data and second position data, the first position data corresponding to the at least one of the first position or the first orientation and the second position data corresponding to the at least one of the second position or the second orientation; determining a displacement of one or more features from the first sensor data to the second sensor data; and determining, as a calibration error of the sensor, a difference between the displacement of the one or more features and an expected displacement of the one or more features based on the first position data and the second position data.

B: The vehicle of example A, the acts further comprising: determining that the calibration error is equal to or exceeds a threshold error; and inhibiting functionality of the vehicle in response to determining that the calibration error meets or exceeds the threshold error.

C: The vehicle of example A or example B, wherein the determining the displacement of the one or more features comprises: identifying the one or more features in the first sensor data; identifying the one or more features in the second sensor data; and determining the displacement as a rotational displacement between the one or more features in the first sensor data and the one or more features in the second sensor data.

D: The vehicle of any one of example A through example C, the acts further comprising: calibrating the inertial measurement unit by: controlling the active suspension system to induce a second motion; determining, at the inertial measurement unit, a first axis, based at least in part on a first rotational component of the second motion about the first axis; and determining, at the inertial measurement unit, a second axis, based at least in part on a second rotational component of the second motion about the second axis.

E: The vehicle of any one of example A through example D, wherein: the first orientation is relative to at least one of the first axis or the second axis; and the second orientation is relative to at least one of the first axis or the second axis.

F: An example method includes: inducing motion of a vehicle; determining, using a first sensor disposed on the vehicle, motion data corresponding to the motion; receiving, from a second sensor disposed on the vehicle, first sensor data generated with the vehicle in at least one of a first position or first orientation resulting from the motion; receiving, from the second sensor, second sensor data generated with the vehicle in at least one of a second position or second orientation resulting from the motion; and determining, based at least in part on the motion data, the first sensor data, and the second sensor data, a calibration error associated with the second sensor.

G: The method of example F, wherein the determining the calibration error comprises: determining differences between the first sensor data and the second sensor data; and comparing the differences to expected differences based at least in part on the motion data.

H: The method of example F or example G, wherein: the second sensor is an image sensor; the first sensor data comprises a first image frame; the second sensor data comprises a second image frame; and the differences comprise rotational differences between a first feature in the first image frame and the first feature in the second image frame.

I: The method of any one of example F through example H, wherein: the second sensor is a LiDAR sensor; the first sensor data comprises a first point cloud associated with a first LiDAR scan; the second sensor data comprises a second point cloud associated with a second LiDAR scan; and the differences comprise rotational differences between a first feature identified in the first point cloud and the first feature identified in the second point cloud.

J: The method of any one of example F through example I, wherein the inducing the motion of the vehicle comprises controlling an active suspension of the vehicle to cause the vehicle to at least one of rotate about a longitudinal axis of the vehicle or rotate about a lateral axis of the vehicle.

K: The method of any one of example F through example H, wherein: the motion data comprises first motion data and second motion data, the first motion data comprises at least one of first position information or first orientation information; and the second motion data comprises at least one of second position information or second orientation information.

L: The method of any one of example F through example K, wherein the first sensor comprises an inertial measurement unit.

M: The method of any one of example F through example L, further comprising calibrating the inertial measurement unit by: inducing a second motion of the vehicle; determining, at the inertial measurement unit, a first axis, based at least in part on a first rotational component of the second motion about the first axis; and determining, at the inertial measurement unit, a second axis, based at least in part on a second rotational component of the second motion about the second axis.

N: The method of any one of example F through example M, further comprising: determining that the calibration error meets or exceeds a threshold error; and inhibiting functionality of the vehicle in response to determining that the calibration error meets or exceeds the threshold error.

O: An example system includes: an actuator; a first sensor; a second sensor having a known position relative to the first sensor; one or more processors; and memory storing instructions that, when executed by the one or more processors, cause the system to perform acts comprising: causing the actuator to induce motion in the system; receiving, from the first sensor, motion data corresponding to the motion; receiving, from the second sensor, first sensor data generated at at least one of a first position or a first orientation of the second sensor resulting from the motion; receiving, from the second sensor, second sensor data generated at at least one of a second position or a second orientation of the second sensor resulting from the motion; and determining, based at least in part on the motion data, the first sensor data, and the second sensor data, a calibration error associated with the sensor.

P: The system of example O, the acts further comprising: determining differences between the first sensor data and the second sensor data; and comparing the differences to expected differences based at least in part on the motion data.

Q: The system of example O or example P, wherein the determining the differences comprises: identifying one or more features in the first sensor data; identifying the one or more features in the second sensor data; and determining the differences as a rotational displacement between the one or more features in the first sensor data and the one or more features in the second sensor data.

R: The system of any one of example O through example Q, wherein: the first sensor comprises an inertial measurement unit; the motion data comprises first motion data and second motion data generated by the inertial measurement unit; the first motion data comprises at least one of first position data and/or first orientation data corresponding to the at least one of the first position or the first orientation; and a) the second motion data comprises at least one of second position data and/or second orientation data corresponding to the at least one of the second position or the second orientation.

S: The system of any one of example O through example R, the acts further comprising: determining that the calibration error meets or exceeds a threshold error; and inhibiting functionality of the system in response to determining that the calibration error meets or exceeds the threshold error.

T: The system of any one of example O through example S, the acts further comprising: determining that the calibration error meets or exceeds a threshold error; and updating subsequent sensor data received from the second sensor at least in part in response to determining that the calibration error meets or exceeds the threshold error.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A vehicle comprising:
an inertial measurement unit;
an active suspension system;
a sensor mounted on the vehicle, the sensor being configured to generate sensor data;
one or more processors; and
memory storing instructions executable by the one or more processors to cause the vehicle to perform acts comprising:
controlling the active suspension system to induce a motion of the vehicle;
receiving, from the sensor, first sensor data generated with the sensor in at least one of a first position or a first orientation resulting from the motion;
receiving, from the sensor, second sensor data generated with the sensor in at least one of a second position or a second orientation resulting from the motion;
receiving, from the inertial measurement unit, first position data and second position data, the first position data corresponding to the at least one of the first position or the first orientation and the second position data corresponding to the at least one of the second position or the second orientation;
determining a displacement of one or more features from the first sensor data to the second sensor data;
determining an expected displacement of the one or more features based on the first position data and the second position data; and
determining, as a calibration error of the sensor, a difference between the displacement of the one or more features and the expected displacement of the one or more features.

2. The vehicle of claim 1, the acts further comprising:
determining that the calibration error is equal to or exceeds a threshold error; and
inhibiting functionality of the vehicle in response to determining that the calibration error meets or exceeds the threshold error.

3. The vehicle of claim 1, wherein the determining the displacement of the one or more features comprises:
identifying the one or more features in the first sensor data;
identifying the one or more features in the second sensor data; and
determining the displacement as a rotational displacement between the one or more features in the first sensor data and the one or more features in the second sensor data.

4. The vehicle of claim 1, the acts further comprising:
calibrating the inertial measurement unit by:
controlling the active suspension system to induce a second motion;
determining, at the inertial measurement unit, a first axis, based at least in part on a first rotational component of the second motion about the first axis; and
determining, at the inertial measurement unit, a second axis, based at least in part on a second rotational component of the second motion about the second axis.

5. The vehicle of claim 4, wherein:
the first orientation is relative to at least one of the first axis or the second axis; and
the second orientation is relative to at least one of the first axis or the second axis.

6. The vehicle of claim 1, wherein the determining the expected displacement of the one or more features comprises:
receiving calibration data about the sensor;
projecting, based at least in part on the calibration data, the first position data, and the second position data, the one or more features from a position in the first sensor data to an expected position; and
determining the expected displacement as a displacement between the position and the expected position.

7. A method comprising:
controlling, using a vehicle controller, a vehicle to induce motion of the vehicle;
determining, using a first sensor disposed on the vehicle, motion data corresponding to the motion;
receiving, from a second sensor disposed on the vehicle, first sensor data associated with the vehicle in at least one of a first position or first orientation resulting from the motion;
receiving, from the second sensor, second sensor data associated with the vehicle in at least one of a second position or second orientation resulting from the motion;
determining a data difference between the first sensor data and the second sensor data;
determining, based on the motion data and the first sensor data, an expected data difference between the first sensor data and the second sensor data; and
determining a calibration error associated with the second sensor as a difference between the data difference and the expected data difference.

8. The method of claim 7, wherein:
the second sensor is an image sensor;
the first sensor data comprises a first image frame;
the second sensor data comprises a second image frame; and
the differences comprise rotational differences between a first feature in the first image frame and the first feature in the second image frame.

9. The method of claim 7, wherein:
the second sensor is a LiDAR sensor;
the first sensor data comprises a first point cloud associated with a first LiDAR scan;
the second sensor data comprises a second point cloud associated with a second LiDAR scan; and
the differences comprise rotational differences between a first feature identified in the first point cloud and the first feature identified in the second point cloud.

10. The method of claim 7, wherein the inducing the motion of the vehicle comprises controlling an active suspension of the vehicle to cause the vehicle to at least one of rotate about a longitudinal axis of the vehicle or rotate about a lateral axis of the vehicle.

11. The method of claim 7, wherein:
the motion data comprises first motion data and second motion data,
the first motion data comprises at least one of first position information or first orientation information; and
the second motion data comprises at least one of second position information or second orientation information.

12. The method of claim 7, wherein the first sensor comprises an inertial measurement unit.

13. The method of claim 12, further comprising calibrating the inertial measurement unit by:
inducing a second motion of the vehicle;
determining, at the inertial measurement unit, a first axis, based at least in part on a first rotational component of the second motion about the first axis; and
determining, at the inertial measurement unit, a second axis, based at least in part on a second rotational component of the second motion about the second axis.

14. The method of claim 7, further comprising:
determining that the calibration error meets or exceeds a threshold error; and
inhibiting functionality of the vehicle in response to determining that the calibration error meets or exceeds the threshold error.

15. The method of claim 7, further comprising:
receiving calibration data associated with the second sensor,
wherein the determining the expected difference is based at least in part on the calibration data.

16. A system comprising:
an actuator;
a first sensor;
a second sensor having a known position relative to the first sensor;
one or more processors; and
non-transitory memory storing instructions that, when executed by the one or more processors, cause the system to perform acts comprising:
causing the actuator to induce motion in the system;
receiving, from the first sensor, motion data corresponding to the motion;
receiving, from the second sensor, first sensor data generated at at least one of a first position or a first orientation of the second sensor resulting from the motion;
receiving, from the second sensor, second sensor data generated at at least one of a second position or a second orientation of the second sensor resulting from the motion;
determining a data difference between the first sensor data and the second sensor data;
determining, based on the motion data, an expected data difference between the first sensor data and the second sensor data; and
determining a calibration error associated with the second sensor as a difference between the data difference and the expected data difference.

17. The system of claim 16, wherein the determining the differences comprises:
identifying one or more features in the first sensor data;
identifying the one or more features in the second sensor data; and
determining the differences as a rotational displacement between the one or more features in the first sensor data and the one or more features in the second sensor data.

18. The system of claim 16, wherein:
the first sensor comprises an inertial measurement unit;
the motion data comprises first motion data and second motion data generated by the inertial measurement unit;
the first motion data comprises at least one of first position data and/or first orientation data corresponding to the at least one of the first position or the first orientation; and
the second motion data comprises at least one of second position data and/or second orientation data corresponding to the at least one of the second position or the second orientation.

19. The system of claim 16, the acts further comprising:
determining that the calibration error meets or exceeds a threshold error; and
inhibiting functionality of the system in response to determining that the calibration error meets or exceeds the threshold error.

20. The system of claim 16, the acts further comprising:
determining that the calibration error meets or exceeds a threshold error; and
updating subsequent sensor data received from the second sensor at least in part in response to determining that the calibration error meets or exceeds the threshold error.

* * * * *